United States Patent
Tanniru et al.

(10) Patent No.: US 11,113,048 B1
(45) Date of Patent: Sep. 7, 2021

(54) UTILIZING ARTIFICIAL INTELLIGENCE AND MACHINE LEARNING MODELS TO REVERSE ENGINEER AN APPLICATION FROM APPLICATION ARTIFACTS

(71) Applicant: Accenture Global Solutions Limited, Dublin (IE)

(72) Inventors: Rajendra Prasad Tanniru, Basking Ridge, NJ (US); Balaji Venkateswaran, Chennai (IN); Alok Jain, Pradesh (IN); Koushik M Vijayaraghavan, Chennai (IN); Aditi Kulkarni, Bengaluru (IN); Rajesh Nagarajan, Chennai (IN); Niyaz Shaffi Hameed Musthafa, Eruvadi (IN); Srinivasan Kootalai Sundaram, Tamil Nadu (IN); Roopalaxmi Manjunath, Bangalore (IN); Jayashri Sridevi, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/802,131

(22) Filed: Feb. 26, 2020

(51) Int. Cl.
  *G06F 9/44* (2018.01)
  *G06F 8/74* (2018.01)
  (Continued)

(52) U.S. Cl.
  CPC ............... *G06F 8/74* (2013.01); *G06F 8/73* (2013.01); *G06F 40/284* (2020.01); *G06N 20/00* (2019.01)

(58) Field of Classification Search
  None
  See application file for complete search history.

(56) References Cited

U.S. PATENT DOCUMENTS

| 10,423,403 B1 | 9/2019 | Natarajan |
| 2010/0077386 A1* | 3/2010 | Akkiraju ............ G06F 8/35 717/136 |

(Continued)

FOREIGN PATENT DOCUMENTS

| EP | 3388986 A1 | 10/2018 |

OTHER PUBLICATIONS

Angelina Prima Kumiati et al., "Implementing Heuristic Miner for Different Types of Event Logs", 2016, 7 pages.

(Continued)

*Primary Examiner* — Insun Kang
(74) *Attorney, Agent, or Firm* — Harrity & Harrity, LLP

(57) ABSTRACT

A device may receive input data identifying user stories, test case documents, event logs, and application logs associated with an application, and may perform natural language processing on the user stories and the test case documents, identified in the input data, to generate a first state diagram associated with the application. The device may process the event logs identified in the input data, with a heuristic miner model, to generate a second state diagram associated with the application, and may process the application logs identified in the input data, with a clustering model, to generate a volumetric analysis associated with the application. The device may perform post processing of the first state diagram, the second state diagram, and the volumetric analysis, to remove duplicate data and unmeaningful data and to generate modified outputs, and may perform actions based on the modified outputs.

20 Claims, 12 Drawing Sheets

(51) Int. Cl.
*G06F 8/73* (2018.01)
*G06F 40/284* (2020.01)
*G06N 20/00* (2019.01)

(56) References Cited

U.S. PATENT DOCUMENTS

| | | | | |
|---|---|---|---|---|
| 2014/0137086 A1* | 5/2014 | Chamieh | ................... | G06F 8/41 |
| | | | | 717/139 |
| 2015/0363197 A1* | 12/2015 | Carback, III | ............. | G06F 8/70 |
| | | | | 717/124 |
| 2017/0168921 A1* | 6/2017 | Jhoney | ................ | G06F 11/008 |
| 2020/0125360 A1* | 4/2020 | Iyer | ................... | G06K 9/00456 |
| 2020/0210306 A1* | 7/2020 | Ghaleb | .................. | G06F 8/427 |
| 2020/0293309 A1* | 9/2020 | Snyder | ..................... | G06F 8/53 |

OTHER PUBLICATIONS

Extended European Search Report for Application No. EP20209735. 8, dated May 11, 2021, 13 pages.

Sleimi A., et al., "Automated Extraction of Semantic Legal Metadata Using Natural Language Processingg", 26th International Requirements Engineering Conference, IEEE. Aug. 2018, pp. 124-135, XP033420244, DOI: 10.1109/RE.2018.00022.

* cited by examiner

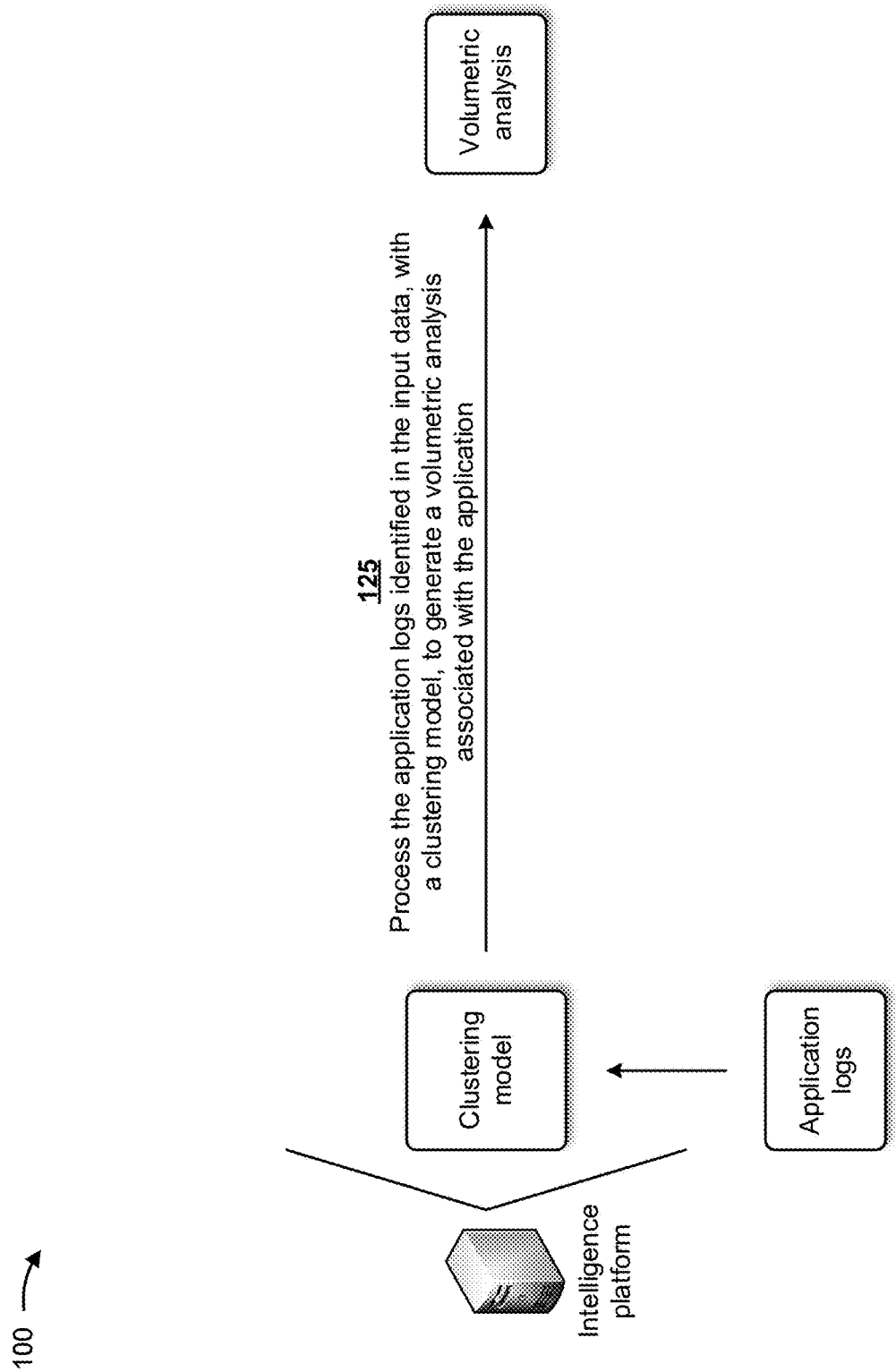

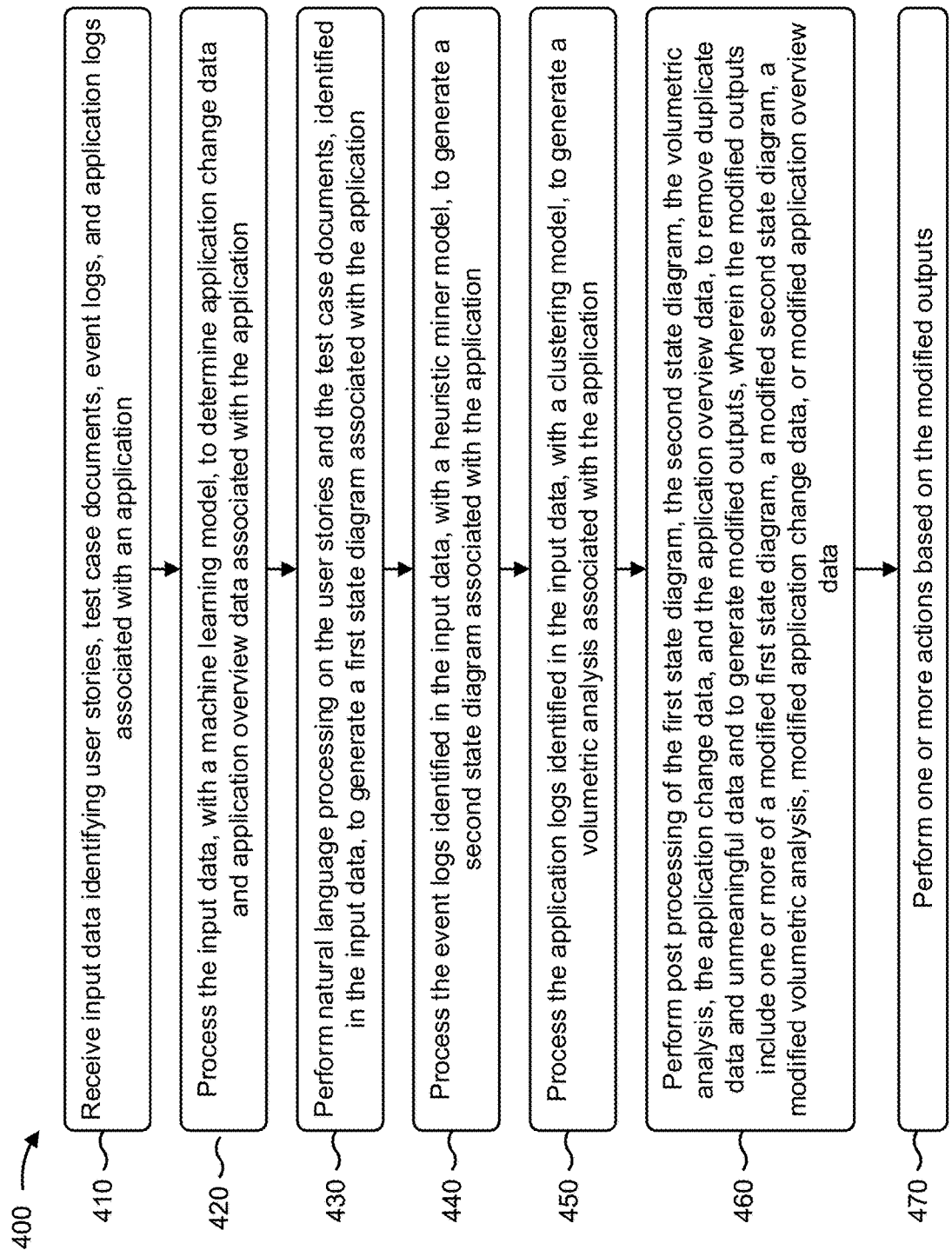

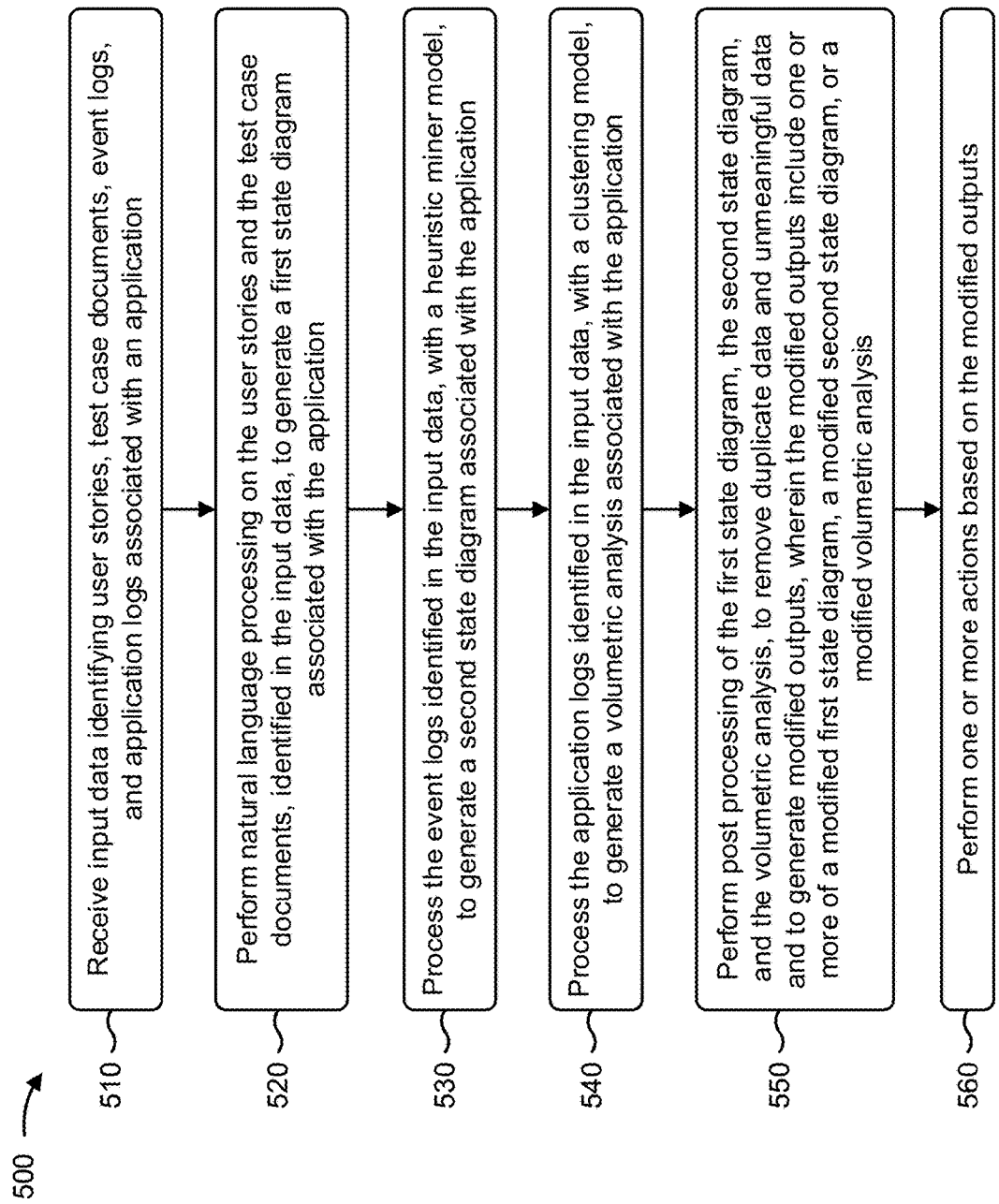

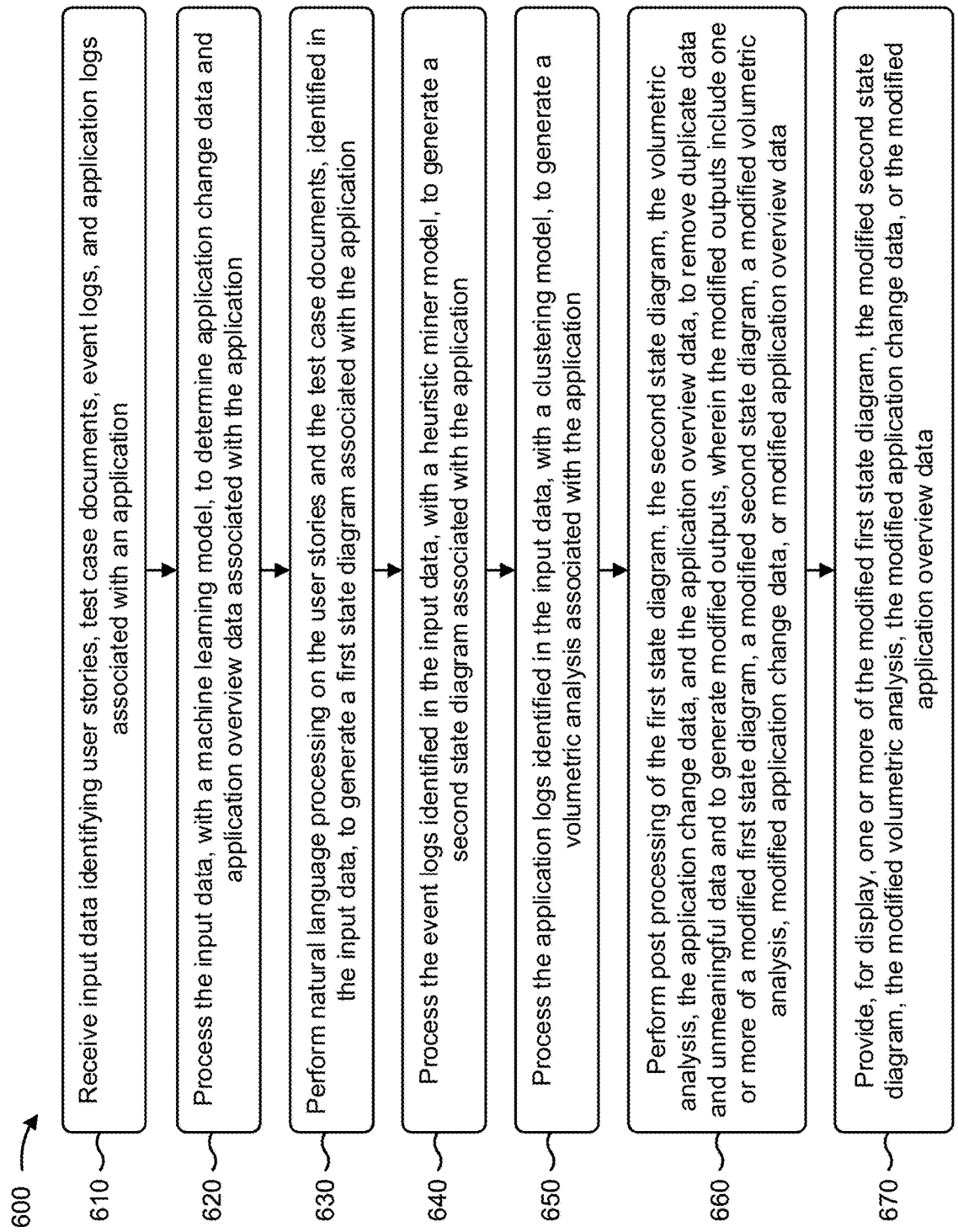

UTILIZING ARTIFICIAL INTELLIGENCE AND MACHINE LEARNING MODELS TO REVERSE ENGINEER AN APPLICATION FROM APPLICATION ARTIFACTS

BACKGROUND

Some entities handle small to large scale application outsourcing and/or maintenance projects on behalf of clients. Such projects may involve transitioning multiple applications from the clients and/or vendors of the clients.

SUMMARY

According to some implementations, a method may include receiving input data identifying user stories, test case documents, event logs, and application logs associated with an application, and processing the input data, with a machine learning model, to determine application change data and application overview data associated with the application. The method may include performing natural language processing on the user stories and the test case documents, identified in the input data, to generate a first state diagram associated with the application, and processing the event logs identified in the input data, with a heuristic miner model, to generate a second state diagram associated with the application. The method may include processing the application logs identified in the input data, with a clustering model, to generate a volumetric analysis associated with the application. The method may include performing post processing of the first state diagram, the second state diagram, the volumetric analysis, the application change data, and the application overview data, to remove duplicate data and unmeaningful data and to generate modified outputs, where the modified outputs may include one or more of a modified first state diagram, a modified second state diagram, a modified volumetric analysis, modified application change data, or modified application overview data. The method may include performing, by the device, one or more actions based on the modified outputs.

According to some implementations, a device may include one or more memories and one or more processors to receive input data identifying user stories, test case documents, event logs, and application logs associated with an application, and perform natural language processing on the user stories and the test case documents, identified in the input data, to generate a first state diagram associated with the application. The one or more processors may process the event logs identified in the input data, with a heuristic miner model, to generate a second state diagram associated with the application, and may process the application logs identified in the input data, with a clustering model, to generate a volumetric analysis associated with the application. The one or more processors may perform post processing of the first state diagram, the second state diagram, and the volumetric analysis, to remove duplicate data and unmeaningful data and to generate modified outputs, where the modified outputs may include one or more of a modified first state diagram, a modified second state diagram, or a modified volumetric analysis. The one or more processors may perform one or more actions based on the modified outputs.

According to some implementations, a non-transitory computer-readable medium may store one or more instructions that, when executed by one or more processors of a device, may cause the one or more processors to receive input data identifying user stories, test case documents, event logs, and application logs associated with an application, and process the input data, with a machine learning model, to determine application change data and application overview data associated with the application. The one or more instructions may cause the one or more processors to perform natural language processing on the user stories and the test case documents, identified in the input data, to generate a first state diagram associated with the application, and process the event logs identified in the input data, with a heuristic miner model, to generate a second state diagram associated with the application. The one or more instructions may cause the one or more processors to process the application logs identified in the input data, with a clustering model, to generate a volumetric analysis associated with the application. The one or more instructions may cause the one or more processors to perform post processing of the first state diagram, the second state diagram, the volumetric analysis, the application change data, and the application overview data, to remove duplicate data and unmeaningful data and to generate modified outputs, where the modified outputs may include one or more of a modified first state diagram, a modified second state diagram, a modified volumetric analysis, modified application change data, or modified application overview data. The one or more instructions may cause the one or more processors to provide, for display, one or more of the modified first state diagram, the modified second state diagram, the modified volumetric analysis, the modified application change data, or the modified application overview data.

BRIEF DESCRIPTION OF THE DRAWINGS

FIGS. 1A-1G are diagrams of one or more example implementations described herein.

FIGS. 4-6 are flow charts of example processes for utilizing artificial intelligence and machine learning models to reverse engineer an application from application artifacts.

DETAILED DESCRIPTION

Figure 1A:
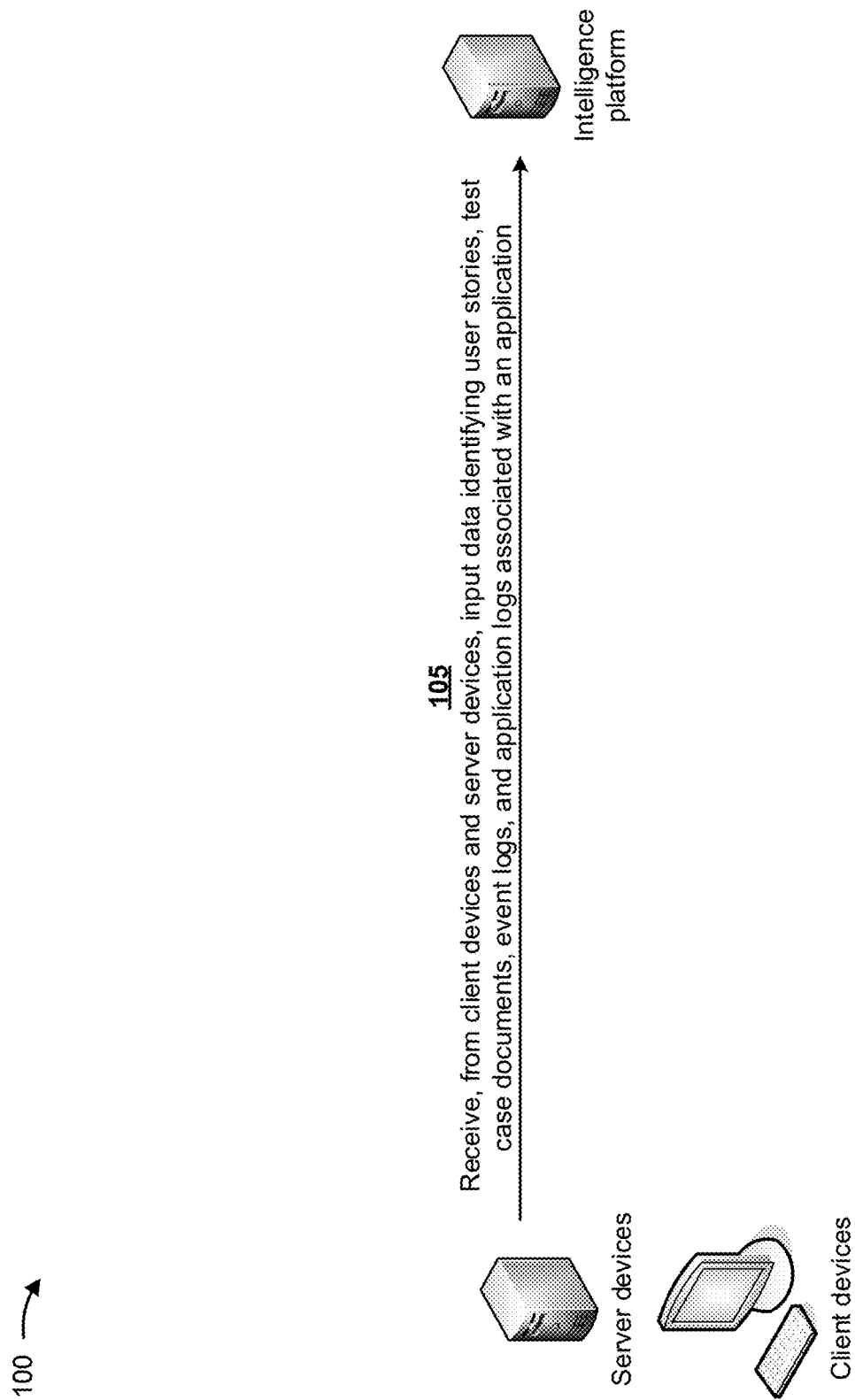

The following detailed description of example implementations refers to the accompanying drawings. The same reference numbers in different drawings may identify the same or similar elements.

Currently, when a client or a vendor of client transition an application to an entity for management, improvement, and/or the like, the entity must first develop an understanding of the application during a knowledge transition phase. The entity may face several issues during this phase. For example, documentation (e.g., a user manual) for the application may be unavailable; information associated with maintenance of the application, execution of the application, and modifications made to the application may be unavailable; large quantities of documentation about the application may be available but may be difficult to review and/or understand; a single source of actual knowledge of the application may be absent; and/or the like. Thus, current techniques for understanding an application may waste computing resources (e.g., processing resources, memory resources, communication resources, and/or the like), networking resources, human resources, and/or the like associated with executing the application to understand features of the application, reviewing large quantities of difficult to understand documentation, attempting to piece application documents together to understand the application, and/or like.

Some implementations described herein provide an intelligence platform that utilizes artificial intelligence and machine learning models to reverse engineer an application from application artifacts. For example, the intelligence platform may receive input data identifying user stories, test case documents, event logs, and application logs associated with an application, and may process the input data, with a machine learning model, to determine application change data and application overview data associated with the application. The intelligence platform may perform natural language processing on the user stories and the test case documents, identified in the input data, to generate a first state diagram associated with the application, and may process the event logs identified in the input data, with a heuristic miner model, to generate a second state diagram associated with the application. The intelligence platform may process the application logs identified in the input data, with a clustering model, to generate a volumetric analysis associated with the application, and may perform post processing of the first state diagram, the second state diagram, the volumetric analysis, the application change data, and the application overview data, to remove duplicate data and unmeaningful data and to generate modified outputs. The modified outputs may include a modified first state diagram, a modified second state diagram, a modified volumetric analysis, modified application change data, modified application overview data, and/or the like. The intelligence platform may perform one or more actions based on the modified outputs.

In this way, the intelligence platform utilizes artificial intelligence and machine learning models to reverse engineer an application from application artifacts. The intelligence platform may utilize available artifacts (e.g., user stories, test cases, application logs, and/or the like) associated with the application to derive state diagrams, volumetric analysis, and/or the like that provide insights into the application. This, in turn, conserves computing resources, networking resources, and/or the like that would otherwise be wasted in executing the application to understand features of the application, reviewing large quantities of difficult to understand documentation, attempting to piece application documents together to understand the application, and/or like.

FIGS. 1A-1G are diagrams of one or more example implementations 100 described herein. As shown in FIG. 1A, one or more client devices may be associated with one or more server devices and an intelligence platform. The client devices may include mobile devices, computers, and/or the like associated with employees of an entity (e.g., a business, a financial institution, a government agency, and/or the like) that utilizes one or more applications. The server devices may include one or more devices associated with the entity and that store the one or more applications and/or data associated with the one or more applications. The intelligence platform may include a platform that utilizes artificial intelligence and machine learning models to reverse engineer an application from application artifacts, as described herein.

As further shown in FIG. 1A, and by reference number 105, the intelligence platform may receive, from the client devices and the server devices, input data identifying user stories, test case documents, event logs, application logs, and/or the like associated with an application. In some implementations, the intelligence platform may periodically receive the input data, may continuously receive the input data, may receive the input data based on a request, and/or the like. Upon receiving the input data, the intelligence platform may store the input data in a data structure (e.g., a database, a table, a list, and/or the like) associated with the intelligence platform.

In some implementations, the user stories may include descriptions of functionalities of the application, informal and natural language descriptions of one or more features of the application, stories written from a perspective of an end user or user of the application, and/or the like. In some implementations, the test case documents may include documents that identify sets of actions to be executed to verify functionalities of the application; sets of conditions or variables under which a test will determine whether the application satisfies requirements or works correctly; input values, expected outputs, and preconditions for executing tests of the application; and/or the like. In some implementations, the event logs may include records of application notifications, stored operating systems, that are used by administrators to diagnose application problems and to predict future issues with the application. In some implementations, the application logs may include files of events that are logged by the application; errors, informational events, and warnings generated by the application; logs that are formatted and include content determined by developers of the application; and/or the like.

Figure 1B:
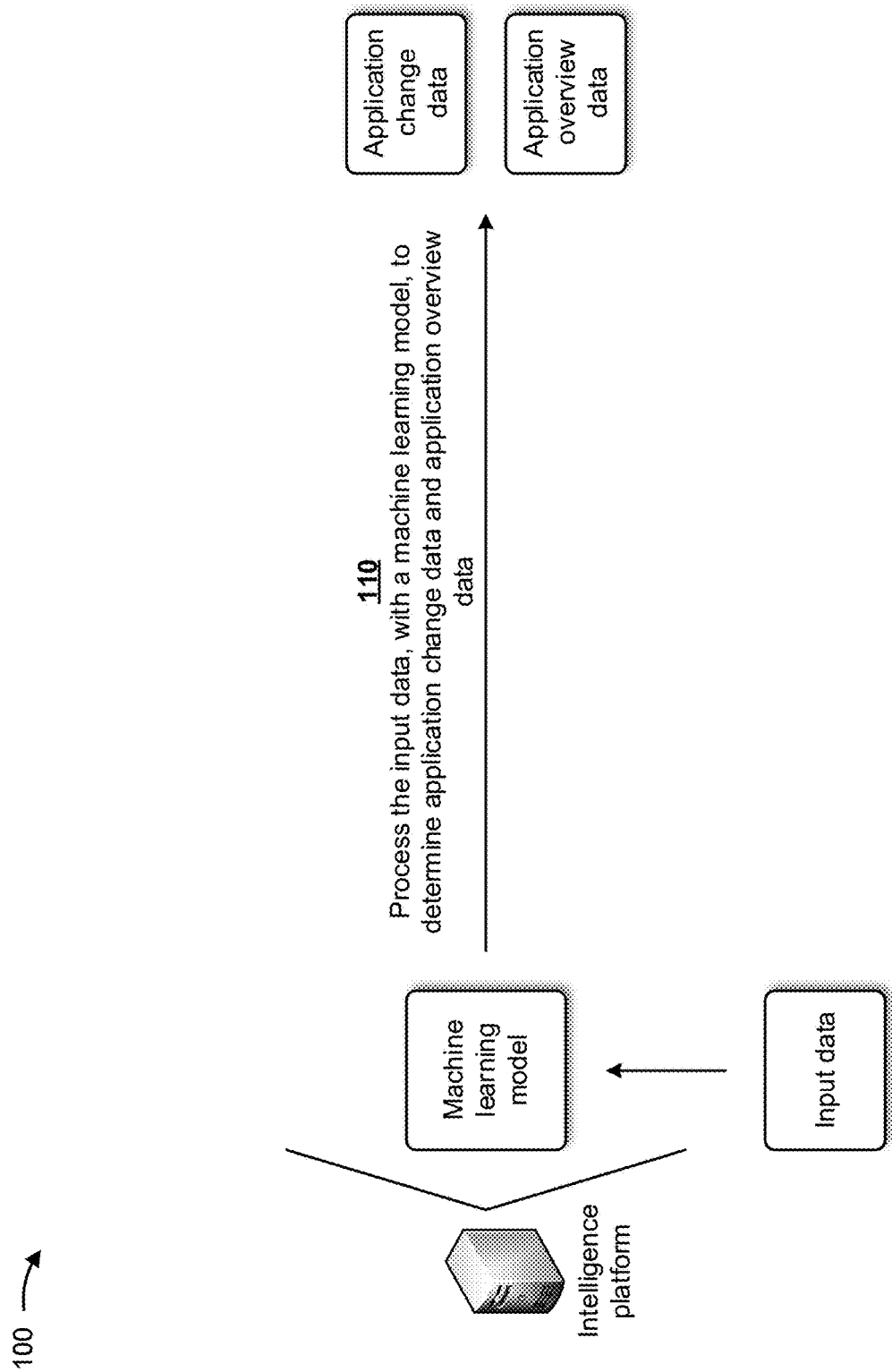

As shown in FIG. 1B, and by reference number 110, the intelligence platform may process the input data, with a machine learning model, to determine application change data and application overview data. In some implementations, application change data may include data identifying changes made to the application, changes made to data utilized by the application, and/or the like. In some implementations, the application overview data may include data identifying a high level description of why the application was created, a reason for which the application is intended or is intended to replace, detailed descriptions of the architecture and components of the application, and/or the like.

In some implementations, the machine learning model may include a random forest classifier model. For example, the intelligence platform may utilize the random forest classifier model to learn from past changes, made by users, to a business flow and/or application overview associated with the application. In some implementations, the intelligence platform may train the machine learning model with historical data (e.g., historical input data) to generate a trained machine learning model. The intelligence platform may separate the historical data into a training set, a validation set, a test set, and/or the like. The training set may be utilized to train the machine learning model. The validation set may be utilized to validate results of the trained machine learning model. The test set may be utilized to test operation of the trained machine learning model.

In some implementations, the intelligence platform may train the machine learning model using, for example, an unsupervised training procedure and based on the historical data. For example, the intelligence platform may perform dimensionality reduction to reduce the historical data to a minimum feature set, thereby reducing resources (e.g., processing resources, memory resources, and/or the like) to train the neural network, and may apply a classification technique to the minimum feature set.

In some implementations, the intelligence platform may use a logistic regression classification technique to determine a categorical outcome (e.g., application change data and/or application overview data). Additionally, or alternatively, the intelligence platform may use a naïve Bayesian classifier technique. In this case, the intelligence platform may perform binary recursive partitioning to split the historical data into partitions and/or branches, and use the partitions and/or branches to determine outcomes (e.g., application change data and/or application overview data). Based on using recursive partitioning, the intelligence platform may reduce utilization of computing resources relative to manual, linear sorting and analysis of data points, thereby enabling use of thousands, millions, or billions of data points to train the machine learning model, which may result in more accurate models than using fewer data points.

Additionally, or alternatively, the intelligence platform may use a support vector machine (SVM) classifier technique to generate a non-linear boundary between data points in the training set. In this case, the non-linear boundary is used to classify test data into a particular class.

Additionally, or alternatively, the intelligence platform may train the machine learning model using a supervised training procedure that includes receiving input to the machine learning model from a subject matter expert, which may reduce an amount of time, an amount of processing resources, and/or the like to train the machine learning model relative to an unsupervised training procedure.

In some implementations, the intelligence platform may use one or more other model training techniques, such as a latent semantic indexing technique, and/or the like. For example, the intelligence platform may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained machine learning model generated by the intelligence platform by making the model more robust to noisy, imprecise, or incomplete data, and by enabling the intelligence platform to detect patterns and/or trends undetectable to human analysts or systems using less complex techniques.

In some implementations, rather than training the machine learning model, the intelligence platform may obtain the trained machine learning model from another system or device that trained the machine learning model to generate the trained machine learning model. In this case, the intelligence platform may provide the other system or device with the historical data for use in training the machine learning model, and may provide the other system or device with updated historical data to retrain the machine learning model in order to update the trained machine learning model.

Figure 1C:
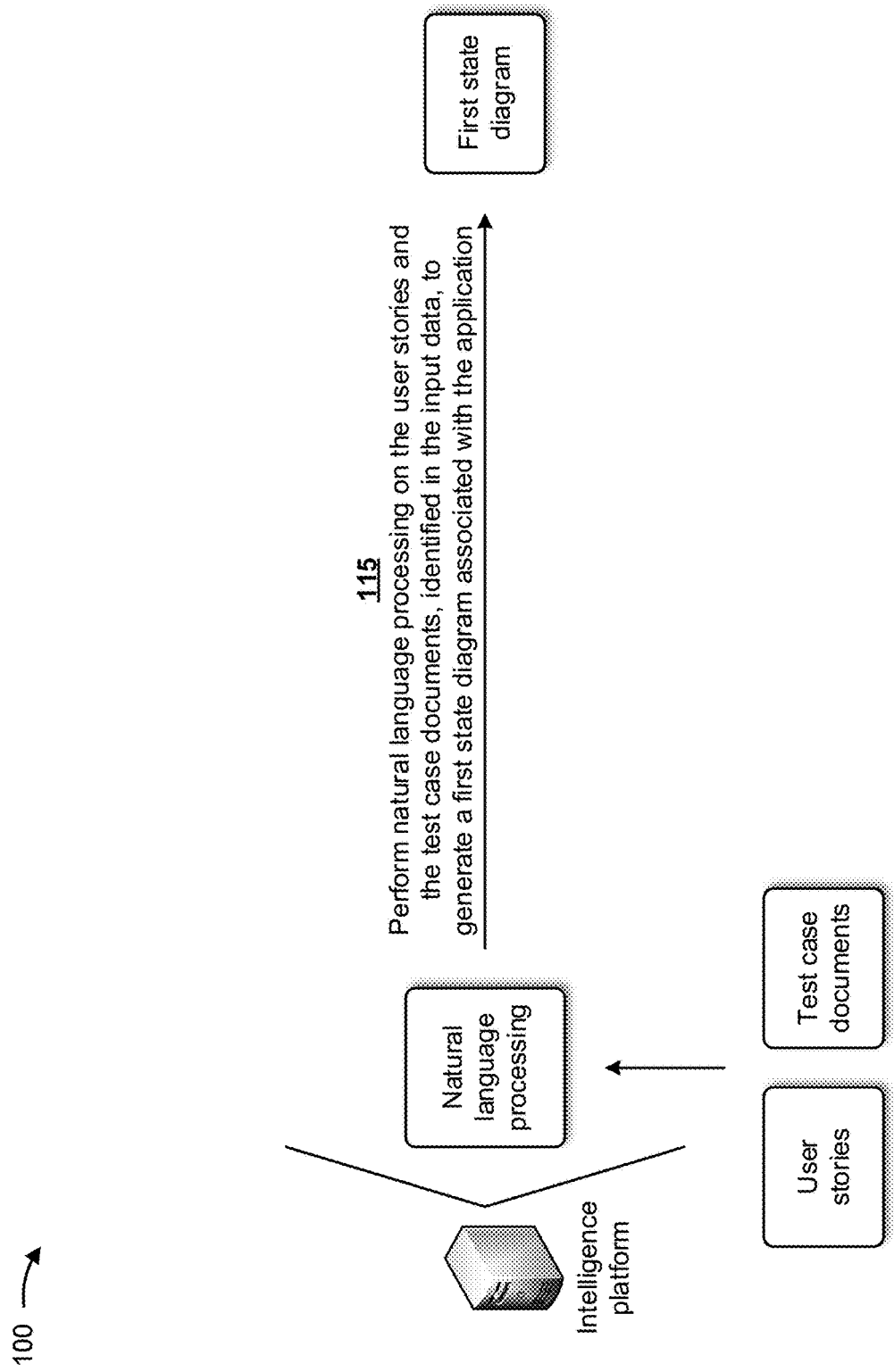

As shown in FIG. 1C, and by reference number 115, the intelligence platform may perform natural language processing on the user stories and the test case documents, identified in the input data, to generate a first state diagram associated with the application. For example, the intelligence platform may identify key areas of a business flow, remove punctuations, remove duplicates, and/or the like. In some implementations, the first state diagram may include representations of processes performed by the application. For example, the first state diagram may represent a condition of a system associated with the application, or part of the system, at finite instances of time. The first state diagram may include a behavioral diagram that represents behavior of the application using finite state transitions In some implementations, the intelligence platform may perform the natural language processing to generate business flow diagrams, semantic networks, and/or the like.

In some implementations, when performing the natural language processing on the user stories and the test case documents, the intelligence platform may remove stop words and punctuations from the user stories and the test case documents, may tokenize words in the user stories and the test case documents to enable analysis of the words, may remove sentences with less than a predetermined quantity of words from the user stories and the test case documents, may determine most frequent keywords utilized in the user stories and the test case documents, and/or the like. In some implementations, when performing the natural language processing on the user stories and the test case documents, the intelligence platform may convert the user stories and the test case documents into a machine-readable text, may split the machine-readable text into an array of words, may split the array of words into sequences of contiguous words, and may calculate word scores for the sequences of contiguous words.

In some implementations, the intelligence platform may perform the natural language processing using a natural language tool kit (NLTK) to generate the first state diagram associated with the application. For example, the intelligence platform may perform the natural language processing using a rapid automatic keyword extraction (RAKE)-NLTK. In the RAKE-NLTK, preprocessed sentences may be fed to a RAKE-NLTK library, and nodes or phrases may be extracted based on a score value to obtain proper nodes. In the RAKE-NLTK model, document text may be split into an array of words by specified word delimiters. The array of words may then be split into sequences of contiguous words at phrase delimiters and stop word positions. The RAKE-NLTK model may evaluate several metrics for calculating word scores, based on a degree and frequency of word vertices in a matrix populated with word occurrence data. The metrics may include a word frequency (freq(w)), a word degree (deg(w)), a ratio of degree to frequency (deg(w)/freq(w)), and/or the like. The word degree may favor words that occur often and in longer candidate keywords, and deg (minimal) may score higher than deg(systems). Words that occur frequently regardless of the number of words with which they co-occur may be favored by the word frequency, and freq(systems) may score higher than freq(minimal). Words that predominantly occur in longer candidate keywords may be favored by the ratio of degree to frequency, where a score for each candidate keyword may be computed as a sum of a member.

In some implementations, the intelligence platform may customize an existing RAKE-NLTK model (e.g., as described above) to perform functions described herein. The customized RAKE-NLTK model may include a text pre-processing component that normalizes text associated with the application, which may come in a variety of formats and styles. In the text pre-processing component, the RAKE-NLTK model may remove stop words and punctuations from the data (e.g., so that corresponding keywords will not appear as most frequent), may perform word tokenization (e.g., which aids in tokenizing words for proper analysis), may remove sentences with less than four words (e.g., as such sentences are unlikely to be meaningful), and/or the like. The customized RAKE-NLTK model may include a text post-processing component that processes the nodes to remove any redundancies or duplicate nodes, removes two or three-word nodes (e.g., which do not provide any meaningful nodes), edits half sentence nodes and merges them with next nodes, provides a sequence counter to determine the flow, and/or the like.

The customized RAKE-NLTK model may accept resulting phrases with values greater than a particular threshold (e.g., four). If there are no phrases with a score greater than the particular threshold, then the customized RAKE-NLTK model may accept resulting phrases with values greater than a lower threshold (e.g., two). The customized RAKE-NLTK model may store the generated data in a data structure, and scripts (e.g., .NET scripts, MX Graph scripts, and/or the like) may read the data from the data structure and may generate knowledge representation visuals (e.g., bar charts, pie charts, trendline charts, grid views, and/or the like) for display to users.

In some implementations, the intelligence platform may perform at least a portion of the natural language processing using a machine learning model. In this case, the intelligence platform may train the machine learning model with historical data (e.g., historical user stories and historical test case documents) to enable the machine learning model to generate a first state diagram as described herein. For example, the intelligence platform may train the machine learning model in a manner similar to the machine learning model described above in connection with FIG. 1B. In some implementations, rather than training the machine learning model, the intelligence platform may obtain the machine learning model from another system or device that trained the machine learning model. In this case, the intelligence platform may provide the other system or device with historical data for use in training the machine learning model, and may provide the other system or device with updated historical data to retrain the machine learning model in order to update the machine learning model.

Figure 1D:
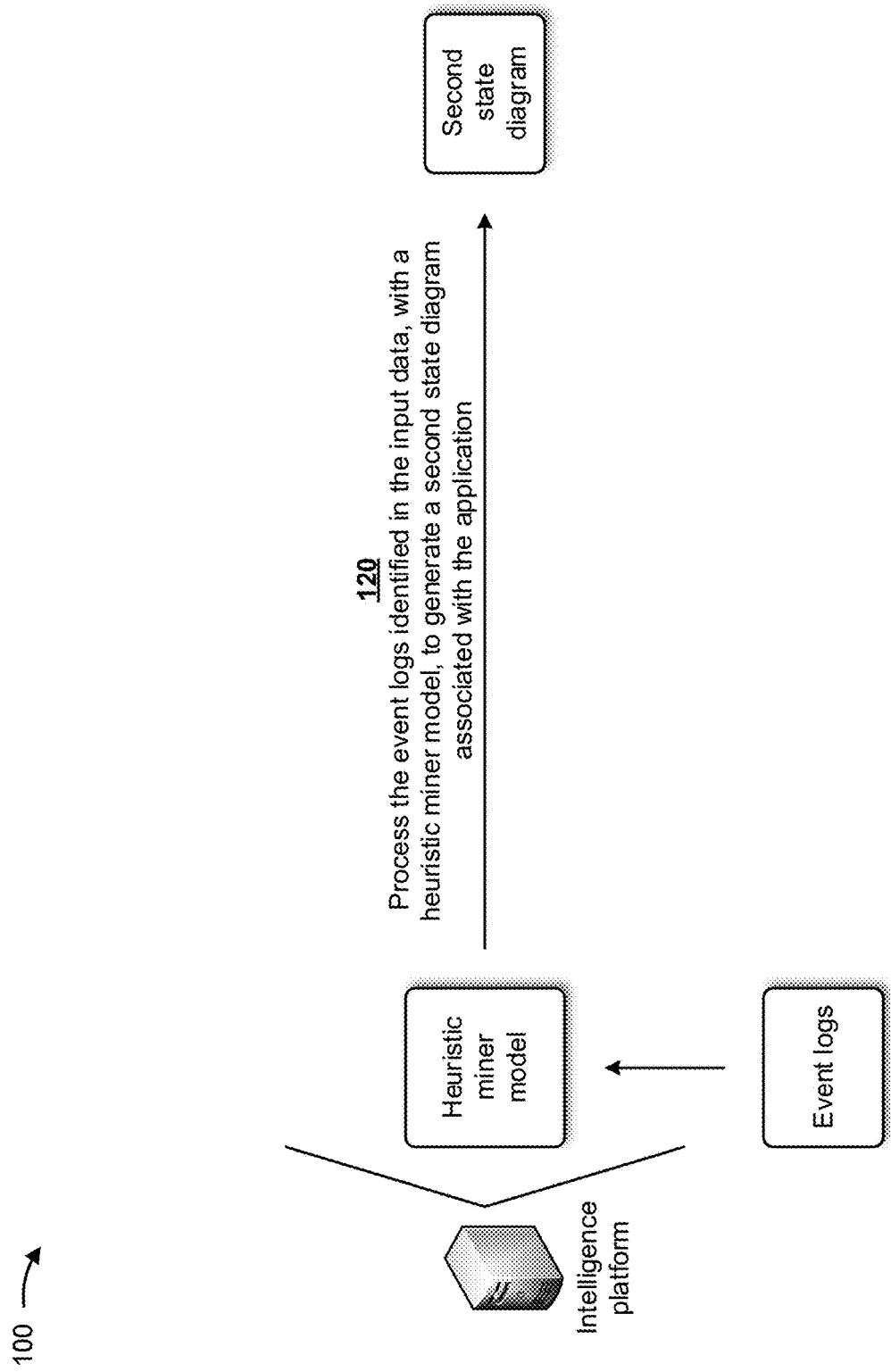

As shown in FIG. 1D, and by reference number 120, the intelligence platform may process the event logs identified in the input data, with a heuristic miner model, to generate a second state diagram associated with the application. In some implementations, the second state diagram may include representations of processes performed by the application. When processing the event logs with the heuristic miner model, the intelligence platform may generate a dependency matrix based on the event logs, and may generate a dependency graph based on the dependency matrix. The intelligence platform may generate a causal matrix based on the event logs, and may generate the second state diagram based on the dependency graph and the causal matrix. In some implementations, when processing the event logs with the heuristic miner model, the intelligence platform may identify, based on the event logs, direct sequence relations and loop relations for the application, and may generate a direct relation matrix based on the direct sequence relations. The intelligence platform may generate a loop relation matrix based on the loop relations, may generate a final matrix based on the direct relation matrix and the loop relation matrix, and may generate the second state diagram based on the final matrix.

In some implementations, the heuristic miner model may calculate a dependency frequency and traces of events in building a process model. To build the process model, the heuristic miner model may analyze the event logs based on dependency values of associated activities. The heuristic miner model may build a dependency graph (e.g., a model which represents dependency (causality) of events). To build the dependency graph, the heuristic miner model may build a dependency matrix with a length-one loop dependency and a length-two loop dependency. Because it is difficult to define whether a process is parallel or sequential to another process, just by analyzing the event log, the heuristic miner model may build a causal matrix to represent a correct process model. Types of non-observed activities may include parallel activities (e.g., represented by AND) and/or sequential activities (e.g., represented by XOR). When building a dependency graph, the heuristic miner model may set thresholds for events to be modeled, including a dependency measure threshold (e.g., a minimum value of dependency between events), a positive observation threshold (e.g., a minimum value of dependency frequency between events), a relative to best threshold (e.g., a minimum value of the difference between an event dependency value and the maximum dependency value), a length-one threshold (e.g., a minimum value of same event dependency), a length-two threshold (e.g., a minimum value of looping pair event dependency), and/or the like.

In some implementations, the intelligence platform may customize an existing heuristic miner model (e.g., as described above) to perform functions described herein. For example, the customized heuristic miner model may check for direct sequence relations and loop relations. The customized heuristic miner model may check for direct sequence relations by checking for a number of occurrences of each trace and activities contained in a matrix, by creating a direct relation matrix based on a threshold value, and by comparing the direct sequence relations based on the formula:

$$\frac{(\text{Number of times activity } A \text{ is followed by activity } B) - (\text{Number of times activity } B \text{ is followed by activity } A)}{((\text{Number of times activity } A \text{ is followed by activity } B) + (\text{Number of times activity } B \text{ is followed by activity } A)) + 1}$$

The customized heuristic miner model may check for loop relations by checking for a number of occurrences of each trace and the activities contained in a matrix, by populating the matrix with the data associated with the number of times an activity is followed by itself, by creating a loop relation matrix based on a threshold value (e.g., 50), and by comparing the direct sequence relations based on the formula:

$$\frac{(\text{Number of times a sequence is followed by activity itself})}{((\text{Number of times a sequence is followed by activity itself})) + 1}$$

The customized heuristic miner model may generate the final matrix based on the direct relation matrix and the loop relation matrix, and may store the final matrix in a data structure.

In some implementations, the heuristic miner model may include a machine learning model. In this case, the intelligence platform may train the machine learning model with historical data (e.g., historical event logs) to enable the machine learning model to generate a second state diagram, as described herein. For example, the intelligence platform may train the machine learning model in a manner similar to the machine learning model described above in connection with FIG. 1B. In some implementations, rather than training the machine learning model, the intelligence platform may obtain the machine learning model from another system or device that trained the machine learning model. In this case, the intelligence platform may provide the other system or device with historical data for use in training the machine learning model, and may provide the other system or device with updated historical data to retrain the machine learning model in order to update the machine learning model.

As shown in FIG. 1E, and by reference number 125, the intelligence platform may process the application logs identified in the input data, with a clustering model, to generate a volumetric analysis associated with the application. The clustering model may identify groups of similar records in the application logs and may label the records according to a group to which the records belong. The clustering model may measure distances between records and between clusters. In some implementations, the volumetric analysis may include a representation of volumes of information processed by the application over a time period, and performance of the application based on the volumes of information. For example, the volumetric analysis may represent a distribution of how different systems are loaded based on the application.

In some implementations, the clustering model may include a machine learning model. In this case, the intelligence platform may train the machine learning model with historical data (e.g., historical application logs) to enable the machine learning model to generate a volumetric analysis as described herein. For example, the intelligence platform may train the machine learning model in a manner similar to the machine learning model described above in connection with FIG. 1B. In some implementations, rather than training the machine learning model, the intelligence platform may obtain the machine learning model from another system or device that trained the machine learning model. In this case, the intelligence platform may provide the other system or device with historical data for use in training the machine learning model, and may provide the other system or device with updated historical data to retrain the machine learning model in order to update the machine learning model.

Figure 1F:
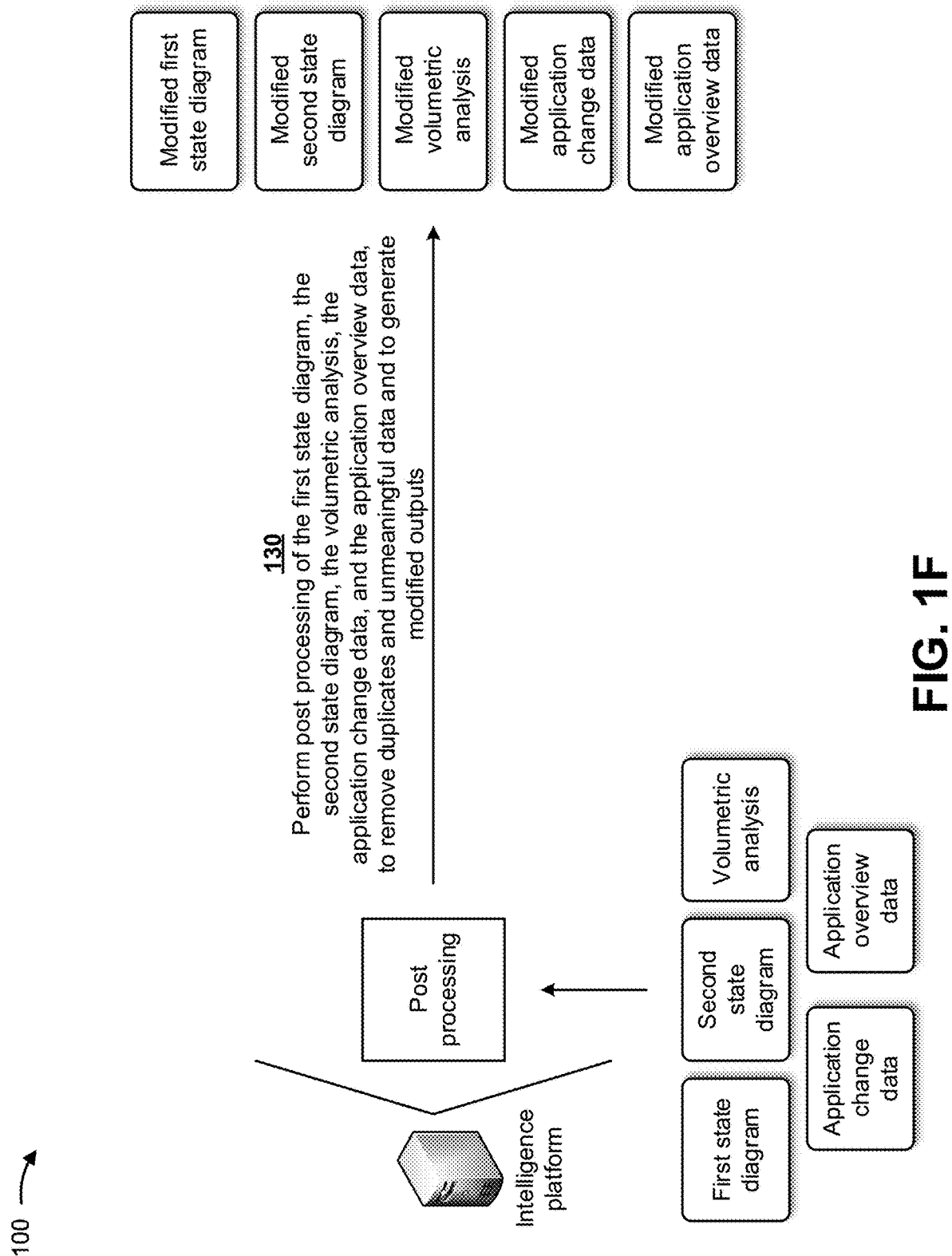

As shown in FIG. 1F, and by reference number 130, the intelligence platform may perform post processing of the first state diagram, the second state diagram, the volumetric analysis, the application change data, and the application overview data, to remove duplicates and unmeaningful data and to generate modified outputs. Based on performing the post processing, the intelligence platform my generate a modified first state diagram, a modified second state diagram, a modified volumetric analysis, modified application change data, and modified application overview data. In some implementations, the intelligence platform may utilize natural language processing to remove the duplicate data and the unmeaningful data from the first state diagram, the second state diagram, the volumetric analysis, the application change data, and the application overview data. For example, the intelligence platform may utilize RAKE-NLTK model, described above in connection with FIG. 1C, to remove duplicates and unmeaningful data and to generate the modified outputs.

In some implementations, the intelligence platform may perform at least a portion of the post processing using a machine learning model. In this case, the intelligence platform may train the machine learning model with historical data (e.g., historical first state diagrams, historical second state diagrams, historical volumetric analyses, historical application change data, and historical application overview data,) to enable the machine learning model to remove duplicates and unmeaningful data and to generate modified outputs, as described herein. For example, the intelligence platform may train the machine learning model in a manner similar to the machine learning model described above in connection with FIG. 1B. In some implementations, rather than training the machine learning model, the intelligence platform may obtain the machine learning model from another system or device that trained the machine learning model. In this case, the intelligence platform may provide the other system or device with historical data for use in training the machine learning model, and may provide the other system or device with updated historical data to retrain the machine learning model in order to update the machine learning model.

Figure 1G:
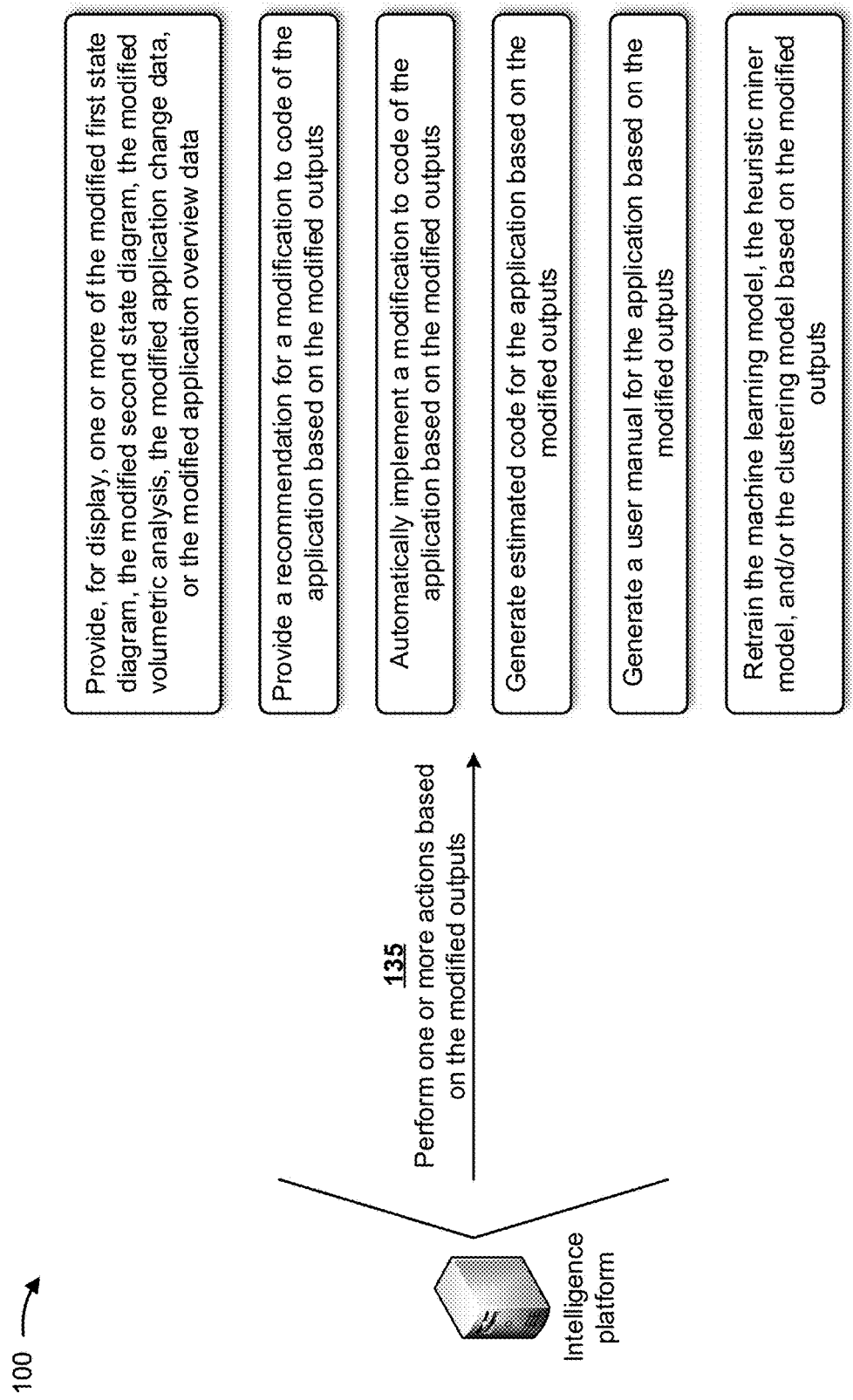

As shown in FIG. 1G, and by reference number 135, the intelligence platform may perform one or more actions based on the modified outputs. In some implementations, the one or more actions may include the intelligence platform providing, for display, one or more of the modified first state diagram, the modified second state diagram, the modified volumetric analysis, the modified application change data, or the modified application overview data. For example, the intelligence platform may provide the modified outputs, for display, via one or more of a bar chart, a pie chart, a trend line chart, a grid view, a flow diagram, a swimlane diagram, and/or the like. In this way, the intelligence platform may enable an entity to review and understand information associated with an application that is being transitioned to the entity, thereby conserving computing resources (e.g., processing resources, memory resources, communication resources, and/or the like), networking resources, and/or the like that would otherwise be wasted in searching through, investigating, and/or interpreting materials that may lack documentation or other information, may come from multiple sources, may be excessive in volume, and/or the like.

In some implementations, the one or more actions may include the intelligence platform providing a recommendation for a modification to code of the application based on the modified outputs. For example, the intelligence platform may recommend that the code of the application be modified to improve operation of the application, to improve operation of application based on an intended platform (e.g., processing power, memory availability, operation system, and/or the like of the intended platform) to which the application is to be transitioned, and/or the like. In this way, the intelligence platform may enable an entity associated with transitioning the application to contemplate and assess potential modifications to code without having to previously determine the potential modifications, thereby conserving resources that would otherwise be wasted in manually analyzing the materials and generating the potential modifications.

In some implementations, the one or more actions may include the intelligence platform automatically implementing a modification to code of the application based on the modified outputs. In this way, the intelligence platform may automatically implement the modification without requiring actions to be performed by one or more human resources of an entity associated with transitioning the application. This may save time and free entity personnel to perform other functions, thereby conserving resources of the entity associated with transitioning the application.

In some implementations, the one or more actions may include the intelligence platform generating estimated code for the application based on the modified outputs. For example, if the code for the application is not available, the intelligence platform may estimate a configuration of the code based on the modified outputs. In this way, the intelligence platform may enable an entity associated with transitioning the application to contemplate, assess, and/or modify the estimated code without having to generate the estimated code, thereby conserving resources that would otherwise be wasted in manually analyzing the materials and generating the potential modifications.

In some implementations, the one or more actions may include the intelligence platform generating a user manual for the application based on the modified outputs. In this way, the intelligence platform may automatically generate a human-friendly resource that would otherwise require considerable time and effort by personnel and computing resources of an entity associated with transitioning the application. This may conserve time and may free entity personnel to perform other functions, and may conserve computing resources of the entity associated with transitioning the application.

In some implementations, the one or more actions may include the intelligence platform retraining the machine learning model, the heuristic miner model, and/or the clustering model based on the modified outputs. In this way, the intelligence platform may improve the accuracy of the machine learning model, the heuristic miner model, and/or the clustering model in processing the input data, which may improve speed and efficiency of the machine learning model, the heuristic miner model, and/or the clustering model and conserve computing resources, networking resources, and/or the like.

In an example implementation, the intelligence platform may perform the following functions. For example, the intelligence platform may receive the following sample user story input file when a component value is directly given.

| User Story | Component |
|---|---|
| As a user, I must be able to place my order, so that I can purchase products at one go. | Place Order |
| As a user, I must be able to find my order, so that I can review my order items before place the order. | Find Orders |
| As a user, I must be able to edit my order, so that I can do any changes in my existing orders. | Edit Order |
| As a user, I must be able to return my order, so that I can return my product suppose it is meet my requirement. | Return Order |

During the generation of business flows, the data present in the component column of the input file may be used as a lane-header values of a flow diagram. For example, place order, find order, edit order, and return order may be used as the lane-header values.

If the component column is empty or has no data in the user story input file, the intelligence platform may enable manual selection of the lane-header values for the flow diagram. Below is the example of how lane values are generated, and sample generated lane values.

| User Story | Component |
|---|---|
| As a user, I must be able to place my order, so that I can purchase products at one go. | |
| As a user, I must be able to find my order, so that I can review my order items before place the order. | |
| As a user, I must be able to edit my order, so that I can do any changes in my existing orders. | |
| As a user, I must be able to return my order, so that I can return my product suppose it is meet my requirement. | |

The intelligence platform may check that lengths of sentences are greater than four and then may utilize the data for further processing.

As a user, I must be able to place my order, so that I can purchase products at one go.
As a user, I must be able to find my order, so that I can review my order items before place the order.
As a user, I must be able to edit my order, so that I can do any changes in my existing orders.
As a user, I must be able to return my order, so that I can return my product suppose it is meet my requirement.

The intelligence platform may process data Summary and Detailed Test Case columns (e.g., for user stories and test case input files, respectively) to identify a top ten words that can be selected as top words for lane headers. The intelligence platform may utilize a NLTK word tokenizer to clean the sentences in these columns by removing stop words and manually-defined junk words. Below is a sample example of the data after processing with NLTK word tokenizer.

as
a
iim
user
i
must
be
able
to
upload
the
user
storiesevent

After this, the intelligence platform may utilize a part-of-speech (POS) tagging concept of natural language processing to identify most frequently occurring nouns and to select top ten words from the most frequently occurring nouns.

| Nodes | Tagging |
|---|---|
| ('iim' | 'NN') |
| ('must' | 'MD') |
| ('able' | 'JJ') |
| ('upload' | 'JJ') |
| ('storiesevent' | 'NN') |
| ('logs' | 'NNS') |
| ('test' | 'VBP') |
| ('cases' | 'NNS') |
| ('application' | 'VBP') |
| ('able' | 'JJ') |
| ('review' | 'NN') |

The intelligence platform may select a first word from the top ten words and may determine whether the selected word is a finalist. If the selected word is a finalist, the intelligence platform may save the selected word in a list, may select a field that includes one of the top words, and may generate the selected word as a node. The intelligence platform may delete values that include "that" and may validate from finalized nodes and final selection of the values. Below shown is a final ten component value words which may be provided to a user for selection of lane headers.

order
place
purchase
products
review
items

-continued

```
edit
changes
orders
return
```

Below is an example of generation of an example business flow diagram for an example order management user story data. The user story may include the following data.

| User Story | Component |
|---|---|
| As a user, I must be able to place my order, so that I can purchase products at one go. | |
| As a user, I must be able to find my order, so that I can review my order items before place the order. | |
| As a user, I must be able to edit my order, so that I can do any changes in my existing orders. | |
| As a user, I must be able to return my order, so that I can return my product suppose it is meet my requirement. | |

The intelligence platform may clean the data and may remove further spaces and special characters from the data. The intelligence platform may remove duplicates from the data, may check a length of each node to determine whether the length is less than two, and may create a list with values. The intelligence platform may remove all the nodes with an index that is less than two, and may deleting values "that" and "validate" from the created nodes. Below is an example after following the cleaning steps mentioned above.

| Sub | nodes | seqnum |
|---|---|---|
| order | as a user, i must be able to place my order, so i can purchase products at one go. | 0 |
| order | as a user, i must be able to find my order, so i can review my order items before place the order. | 1 |
| order | as a user, i must be able to edit my order, so i can do any changes in my existing orders . | 2 |
| order | as a user, i must be able to return my order, so i can return my product suppose it is meet my requirement. | 3 |

The intelligence platform may utilize the RAKE-NLTK model to populate the business flow data in a swimlane fashion. The preprocessed sentences may be provided to the RAKE-NLTK library, and the nodes or phrases may be extracted based on a score value and to obtain proper nodes. In some implementations, the intelligence platform may generate the following output.

| 1 | application_name | order | as a user, i must be able to place my order, so i can purchase products at one go. | order | (4.0, 'purchase products'), (4.0, 'one go'), (1.0, 'user'), (1.0, 'place'), (1.0, 'order'), (1.0, 'must'), (1.0, 'able')] | 13.0 |
|---|---|---|---|---|---|---|
| 2 | application_name | order | as a user, i must be able to find my order, so i can review my order items before place the order. | order | (3.5, 'order items'), (1.5, 'order'), (1.0, 'user'), (1.0, 'review'), (1.0, 'place'), (1.0, 'must'), (1.0, 'find'), (1.0, 'able')] | 11.0 |
| 3 | application_name | order | as a user, i must be able to edit my order, so i can do any changes in my existing orders. | order | [(4.0, 'existing orders'), (1.0, 'user'), (1.0, 'order'), (1.0, 'must'), (1.0, 'edit'), (1.0, 'changes'), (1.0, 'able')] | 10.0 |
| 4 | application_name | order | as a user, i must be able to return my order, so i can return my product suppose it is meet my requirement. | order | [(4.0, 'product suppose'), (1.0, 'user'), (1.0, 'return'), (1.0, 'return'), (1.0, 'requirement'), (1.0, 'order'), (1.0, 'must'), (1.0, 'meet'), (1.0, 'able')] | 12.0 |

After every candidate keyword is identified and a graph of word co-occurrences is complete, a score may be calculated for each candidate keyword and defined as a sum of member word scores. The intelligence platform may evaluate several metrics for calculating word scores, based on the degree and frequency of word vertices, word frequency, word degree, and a ratio of degree to frequency.

| | | Frequency | | | | | | | |
|---|---|---|---|---|---|---|---|---|---|
| | | able | go | must | one | order | place | products | purchase | user |
| degree | able | 1 | | | | | | | | |
| | go | | 1 | | 1 | | | | | |
| | must | | | 1 | | | | | | |
| | one | | 1 | | 1 | | | | | |
| | order | | | | | 1 | | | | |
| | place | | | | | | 1 | | | |
| | products | | | | | | | 1 | 1 | |
| | purchase | | | | | | | 1 | 1 | |
| | user | | | | | | | | | 1 |

|       | able | go | must | one | order | place | products | purchase | user |
|-------|------|----|----|-----|-------|-------|----------|----------|------|
| Deg   | 1    | 2  | 1  | 2   | 1     | 1     | 2        | 2        | 1    |
| Feq   | 1    | 1  | 1  | 1   | 1     | 1     | 1        | 1        | 1    |
| Deg/Feq | 1  | 2  | 1  | 2   | 1     | 1     | 2        | 2        | 1    |

(Purchase Product,4)(one go,4)(User,1)(Must,1)(Able,1)(place,1)(order,1)

The intelligence platform may consider the values of the ranked phrases with values greater than four. However, since there are no phrases with a ranked score greater than four, two may become a next threshold value for the selection of phrases. Once the phrases with threshold values greater than four, or greater than two in some cases, are obtained from RAKE-NLTK processing, an arrangement of the phrases may change. These phrases may be compared with the original input data and sequences may be rearranged in an input order. To obtain an original sequence of phrases, multiple loops and conditions may be applied. In post processing, the nodes may be processed to remove any redundancies, duplicate nodes, two or three-word nodes, and/or the like. Half sentence nodes may be edited and merged with a next node to make a more meaningful data flow output, and an overall flow is generated as follows.

| Pool | Lane | Nodes | isConditional | groupName | isGroup | target | seq | seqnum |
|------|------|-------|---------------|-----------|---------|--------|-----|--------|
| application_name | order | purchase products | | order_order | | NA | 1 | 0 |
| application_name | order | order items | | order_order | | NA | 2 | 1 |
| application_name | order | existing orders | | order_order | | NA | 3 | 2 |

In this way, several different stages of the process for reverse engineering an application from application artifacts are automated via artificial intelligence and machine learning models, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes artificial intelligence and machine learning models to reverse engineer an application from application artifacts in the manner described herein. Finally, the process for utilizing artificial intelligence and machine learning models to reverse engineer an application from application artifacts conserves computing resources, networking resources, and/or the like that would otherwise be wasted in executing the application to understand features of the application, reviewing large quantities of difficult to understand documentation, attempting to piece application documents together to understand the application, and/or like.

As indicated above, FIGS. 1A-1G are provided merely as examples. Other examples may differ from what is described with regard to FIGS. 1A-1G.

Figure 2:
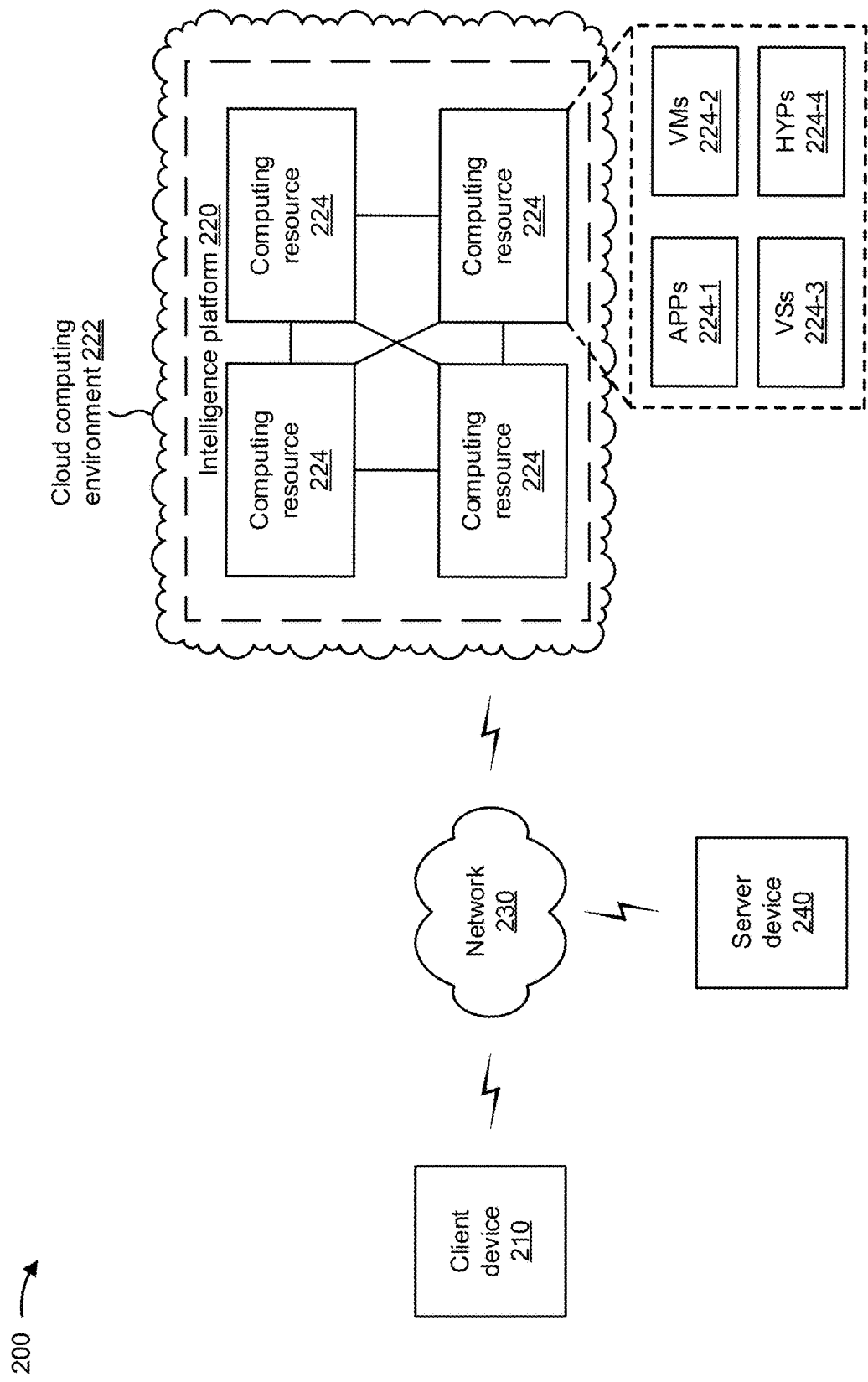
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, an intelligence platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to intelligence platform 220 and/or server device 240.

Intelligence platform 220 includes one or more devices that utilize artificial intelligence and machine learning models to reverse engineer an application from application artifacts. In some implementations, intelligence platform 220 may be designed to be modular such that certain software components may be swapped in or out depending on a particular need. As such, intelligence platform 220 may be easily and/or quickly reconfigured for different uses. In some implementations, intelligence platform 220 may receive information from and/or transmit information to one or more client devices 210 and/or server devices 240.

In some implementations, as shown, intelligence platform 220 may be hosted in a cloud computing environment 222. Notably, while implementations described herein describe intelligence platform 220 as being hosted in cloud computing environment 222, in some implementations, intelligence platform 220 may not be cloud-based (i.e., may be implemented outside of a cloud computing environment) or may be partially cloud-based.

Cloud computing environment 222 includes an environment that hosts intelligence platform 220. Cloud computing environment 222 may provide computation, software, data access, storage, etc., services that do not require end-user knowledge of a physical location and configuration of system(s) and/or device(s) that hosts intelligence platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host intelligence platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or server device 240. Application 224-1 may eliminate a need to install and execute the software applications on client device 210. For example, application 224-1 may include software associated with intelligence platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of intelligence platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device. In some implementations, server device 240 may receive information from and/or transmit information to client device 210 and/or intelligence platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
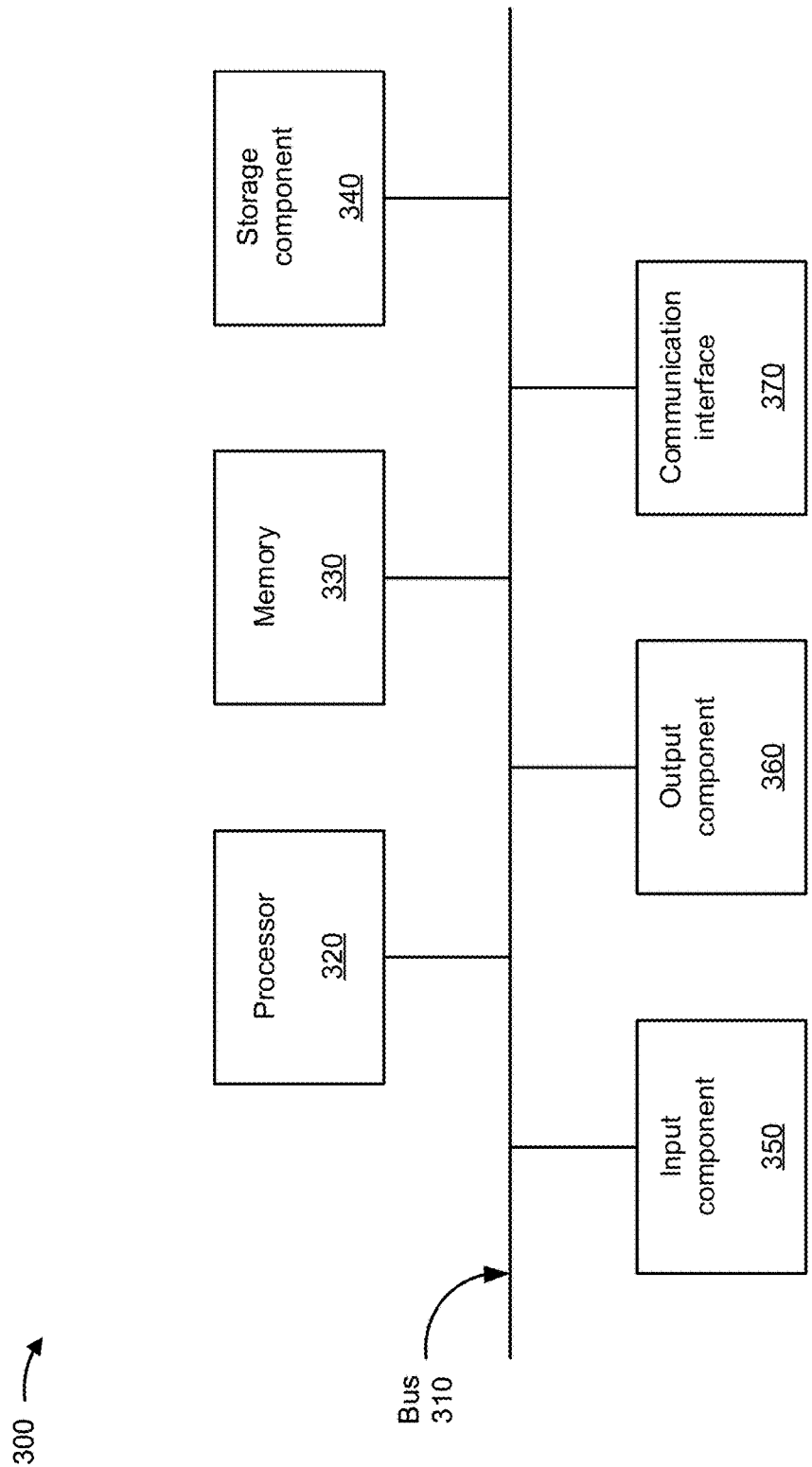
FIG. 3 is a diagram of example components of one or more devices of FIG. 2.

FIG. 3 is a diagram of example components of a device 300. Device 300 may correspond to client device 210, intelligence platform 220, computing resource 224, and/or server device 240. In some implementations, client device 210, intelligence platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing artificial intelligence and machine learning models to reverse engineer an application from application artifacts. In some implementations, one or more process blocks of FIG. 4 may be performed by a device (e.g., intelligence platform 220). In some implementations, one or more process blocks of FIG. 4 may be performed by another device or a group of devices separate from or including the device, such as a client device (e.g., client device 210), a server device (e.g., server device 240), and/or the like.

As shown in FIG. 4, process 400 may include receiving input data identifying user stories, test case documents, event logs, and application logs associated with an application (block 410). For example, the device (e.g., using computing resource 224, processor 320, communication interface 370, and/or the like) may receive input data identifying user stories, test case documents, event logs, and application logs associated with an application, as described above.

As further shown in FIG. 4, process 400 may include processing the input data, with a machine learning model, to determine application change data and application overview data associated with the application (block 420). For example, the device (e.g., using computing resource 224, processor 320, memory 330, and/or the like) may process the input data, with a machine learning model, to determine application change data and application overview data associated with the application, as described above.

As further shown in FIG. 4, process 400 may include performing natural language processing on the user stories and the test case documents, identified in the input data, to generate a first state diagram associated with the application (block 430). For example, the device (e.g., using computing resource 224, processor 320, storage component 340, and/or the like) may perform natural language processing on the user stories and the test case documents, identified in the input data, to generate a first state diagram associated with the application, as described above.

As further shown in FIG. 4, process 400 may include processing the event logs identified in the input data, with a heuristic miner model, to generate a second state diagram associated with the application (block 440). For example, the device (e.g., using computing resource 224, processor 320, memory 330, storage component 340, and/or the like) may process the event logs identified in the input data, with a heuristic miner model, to generate a second state diagram associated with the application, as described above.

As further shown in FIG. 4, process 400 may include processing the application logs identified in the input data, with a clustering model, to generate a volumetric analysis associated with the application (block 450). For example, the device (e.g., using computing resource 224, processor 320, memory 330, and/or the like) may process the application logs identified in the input data, with a clustering model, to generate a volumetric analysis associated with the application, as described above.

As further shown in FIG. 4, process 400 may include performing post processing of the first state diagram, the second state diagram, the volumetric analysis, the application change data, and the application overview data, to remove duplicate data and unmeaningful data and to generate modified outputs, wherein the modified outputs include one or more of a modified first state diagram, a modified second state diagram, a modified volumetric analysis, modified application change data, or modified application overview data (block 460). For example, the device (e.g., using computing resource 224, processor 320, storage component 340, and/or the like) may perform post processing of the first state diagram, the second state diagram, the volumetric analysis, the application change data, and the application overview data, to remove duplicate data and unmeaningful data and to generate modified outputs, as described above. In some implementations, the modified outputs may include a modified first state diagram, a modified second state diagram, a modified volumetric analysis, modified application change data, or modified application overview data.

As further shown in FIG. 4, process 400 may include performing one or more actions based on the modified outputs (block 470). For example, the device (e.g., using computing resource 224, processor 320, memory 330, storage component 340, communication interface 370, and/or the like) may perform one or more actions based on the modified outputs, as described above.

Process 400 may include additional implementations, such as any single implementation or any combination of implementations described below and/or in connection with one or more other processes described elsewhere herein.

In a first implementation, performing the one or more actions may include providing, for display, one or more of the modified first state diagram, the modified second state diagram, the modified volumetric analysis, the modified application change data, or the modified application overview data; providing a recommendation for a modification to code of the application based on the modified outputs; or automatically implementing a modification to code of the application based on the modified outputs.

In a second implementation, alone or in combination with the first implementation, performing the one or more actions may include generating estimated code for the application based on the modified outputs; generating a user manual for the application based on the modified outputs; or retraining one or more of the machine learning model, the heuristic miner model, or the clustering model based on the modified outputs.

In a third implementation, alone or in combination with one or more of the first and second implementations, performing the natural language processing on the user stories and the test case documents may include removing stop words and punctuations from the user stories and the test case documents; tokenizing words in the user stories and the test case documents to enable analysis of the words; removing sentences with less than a predetermined quantity of words from the user stories and the test case documents; and determining most frequent keywords utilized in the user stories and the test case documents.

In a fourth implementation, alone or in combination with one or more of the first through third implementations, performing the post processing of the first state diagram, the second state diagram, the volumetric analysis, the application change data, and the application overview data may include utilizing natural language processing to remove the duplicate data and the unmeaningful data from the first state diagram, the second state diagram, the volumetric analysis, the application change data, and the application overview data.

In a fifth implementation, alone or in combination with one or more of the first through fourth implementations, processing the event logs identified in the input data, with the heuristic miner model, to generate the second state diagram may include generating a dependency matrix based on the event logs; generating a dependency graph based on the dependency matrix; generating a causal matrix based on the event logs; and generating the second state diagram based on the dependency graph and the causal matrix.

In a sixth implementation, alone or in combination with one or more of the first through fifth implementations, the machine learning model may include a random forest classifier model.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for utilizing artificial intelligence and machine learning models to reverse engineer an application from application artifacts. In some implementations, one or more process blocks of FIG. 5 may be performed by a device (e.g., intelligence platform 220). In some implementations, one or more process blocks of FIG. 5 may be performed by another device or a group of devices separate from or including the device, such as a client device (e.g., client device 210), a server device (e.g., server device 240), and/or the like.

As shown in FIG. 5, process 500 may include receiving input data identifying user stories, test case documents, event logs, and application logs associated with an application (block 510). For example, the device (e.g., using computing resource 224, processor 320, memory 330, communication interface 370, and/or the like) may receive input data identifying user stories, test case documents, event logs, and application logs associated with an application, as described above.

As further shown in FIG. 5, process 500 may include performing natural language processing on the user stories and the test case documents, identified in the input data, to generate a first state diagram associated with the application (block 520). For example, the device (e.g., using computing resource 224, processor 320, memory 330, and/or the like) may perform natural language processing on the user stories and the test case documents, identified in the input data, to generate a first state diagram associated with the application, as described above.

As further shown in FIG. 5, process 500 may include processing the event logs identified in the input data, with a heuristic miner model, to generate a second state diagram associated with the application (block 530). For example, the device (e.g., using computing resource 224, processor 320, storage component 340, and/or the like) may process the event logs identified in the input data, with a heuristic miner model, to generate a second state diagram associated with the application, as described above.

As further shown in FIG. 5, process 500 may include processing the application logs identified in the input data, with a clustering model, to generate a volumetric analysis associated with the application (block 540). For example, the device (e.g., using computing resource 224, processor 320, memory 330, storage component 340, and/or the like) may process the application logs identified in the input data, with a clustering model, to generate a volumetric analysis associated with the application, as described above.

As further shown in FIG. 5, process 500 may include performing post processing of the first state diagram, the second state diagram, and the volumetric analysis, to remove duplicate data and unmeaningful data and to generate modified outputs, wherein the modified outputs include one or more of a modified first state diagram, a modified second state diagram, or a modified volumetric analysis (block 550). For example, the device (e.g., using computing resource 224, processor 320, memory 330, and/or the like) may perform post processing of the first state diagram, the second state diagram, and the volumetric analysis, to remove duplicate data and unmeaningful data and to generate modified outputs, as described above. In some implementations, the modified outputs may include a modified first state diagram, a modified second state diagram, or a modified volumetric analysis.

As further shown in FIG. 5, process 500 may include performing one or more actions based on the modified outputs (block 560). For example, the device (e.g., using computing resource 224, processor 320, memory 330, storage component 340, communication interface 370, and/or the like) may perform one or more actions based on the modified outputs, as described above.

Process 500 may include additional implementations, such as any single implementation or any combination of implementations described below and/or in connection with one or more other processes described elsewhere herein.

In a first implementation, the first state diagram and the second state diagram may include representations of processes performed by the application.

In a second implementation, alone or in combination with the first implementation, the volumetric analysis may include a representation of volumes of information processed by the application over a time period.

In a third implementation, alone or in combination with one or more of the first and second implementations, performing the natural language processing on the user stories and the test case documents may include converting the user stories and the test case documents into a machine-readable text; splitting the machine-readable text into an array of words; splitting the array of words into sequences of contiguous words; and calculating word scores for the sequences of contiguous words.

In a fourth implementation, alone or in combination with one or more of the first through third implementations, processing the event logs identified in the input data, with the heuristic miner model, to generate the second state diagram may include identifying, based on the event logs, direct sequence relations and loop relations for the application; generating a direct relation matrix based on the direct sequence relations; generating a loop relation matrix based on the loop relations; generating a final matrix based on the direct relation matrix and the loop relation matrix; and generating the second state diagram based on the final matrix.

In a fifth implementation, alone or in combination with one or more of the first through fourth implementations, the user stories may include descriptions of functionalities of the application.

In a sixth implementation, alone or in combination with one or more of the first through fifth implementations, the test case documents may include sets of actions to be executed to verify functionalities of the application.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing artificial intelligence and machine learning models to reverse engineer an application from application artifacts. In some implementations, one or more process blocks of FIG. 6 may be performed by a device (e.g., intelligence platform 220). In some implementations, one or more process blocks of FIG. 6 may be performed by another device or a group of devices separate from or including the device, such as a client device (e.g., client device 210), a server device (e.g., server device 240), and/or the like.

As shown in FIG. 6, process 600 may include receiving input data identifying user stories, test case documents, event logs, and application logs associated with an application (block 610). For example, the device (e.g., using computing resource 224, processor 320, communication interface 370, and/or the like) may receive input data identifying user stories, test case documents, event logs, and application logs associated with an application, as described above.

As further shown in FIG. 6, process 600 may include processing the input data, with a machine learning model, to determine application change data and application overview data associated with the application (block 620). For example, the device (e.g., using computing resource 224, processor 320, memory 330, and/or the like) may process the input data, with a machine learning model, to determine application change data and application overview data associated with the application, as described above.

As further shown in FIG. 6, process 600 may include performing natural language processing on the user stories and the test case documents, identified in the input data, to generate a first state diagram associated with the application (block 630). For example, the device (e.g., using computing resource 224, processor 320, storage component 340, and/or the like) may perform natural language processing on the user stories and the test case documents, identified in the input data, to generate a first state diagram associated with the application, as described above.

As further shown in FIG. 6, process 600 may include processing the event logs identified in the input data, with a heuristic miner model, to generate a second state diagram associated with the application (block 640). For example, the device (e.g., using computing resource 224, processor 320, memory 330, storage component 340, and/or the like) may process the event logs identified in the input data, with a heuristic miner model, to generate a second state diagram associated with the application, as described above.

As further shown in FIG. 6, process 600 may include processing the application logs identified in the input data, with a clustering model, to generate a volumetric analysis associated with the application (block 650). For example, the device (e.g., using computing resource 224, processor 320, memory 330, and/or the like) may process the application logs identified in the input data, with a clustering model, to generate a volumetric analysis associated with the application, as described above.

As further shown in FIG. 6, process 600 may include performing post processing of the first state diagram, the second state diagram, the volumetric analysis, the application change data, and the application overview data, to remove duplicate data and unmeaningful data and to generate modified outputs, wherein the modified outputs include one or more of a modified first state diagram, a modified second state diagram, a modified volumetric analysis, modified application change data, or modified application overview data (block 660). For example, the device (e.g., using computing resource 224, processor 320, storage component 340, and/or the like) may perform post processing of the first state diagram, the second state diagram, the volumetric analysis, the application change data, and the application overview data, to remove duplicate data and unmeaningful data and to generate modified outputs, as described above. In some implementations, the modified outputs may include a modified first state diagram, a modified second state diagram, a modified volumetric analysis, modified application change data, or modified application overview data.

As further shown in FIG. 6, process 600 may include providing, for display, one or more of the modified first state diagram, the modified second state diagram, the modified volumetric analysis, the modified application change data, or the modified application overview data (block 670). For example, the device (e.g., using computing resource 224, processor 320, memory 330, storage component 340, communication interface 370, and/or the like) may provide, for display, one or more of the modified first state diagram, the modified second state diagram, the modified volumetric analysis, the modified application change data, or the modified application overview data, as described above.

Process 600 may include additional implementations, such as any single implementation or any combination of implementations described below and/or in connection with one or more other processes described elsewhere herein.

In a first implementation, process 600 may include providing a recommendation for a modification to code of the application based on the modified outputs; automatically implementing a modification to code of the application based on the modified outputs; generating estimated code for the application based on the modified outputs; generating a user manual for the application based on the modified outputs; or retraining one or more of the machine learning model, the heuristic miner model, or the clustering model based on the modified outputs.

In a second implementation, alone or in combination with the first implementation, performing the natural language processing on the user stories and the test case documents may include removing stop words and punctuations from the user stories and the test case documents; tokenizing words in the user stories and the test case documents to enable analysis of the words; removing sentences with less than a predetermined quantity of words from the user stories and the test case documents; and determining most frequent keywords utilized in the user stories and the test case documents.

In a third implementation, alone or in combination with one or more of the first and second implementations, processing the event logs identified in the input data, with the heuristic miner model, to generate the second state diagram may include generating a dependency matrix based on the event logs; generating a dependency graph based on the dependency matrix; generating a causal matrix based on the event logs; and generating the second state diagram based on the dependency graph and the causal matrix.

In a fourth implementation, alone or in combination with one or more of the first through third implementations, performing the natural language processing on the user stories and the test case documents may include converting the user stories and the test case documents into a machine-readable text; splitting the machine-readable text into an array of words; splitting the array of words into sequences of contiguous words; and calculating word scores for the sequences of contiguous words.

In a fifth implementation, alone or in combination with one or more of the first through fourth implementations, processing the event logs identified in the input data, with the heuristic miner model, to generate the second state diagram may include identifying, based on the event logs, direct sequence relations and loop relations for the application; generating a direct relation matrix based on the direct sequence relations; generating a loop relation matrix based on the loop relations; generating a final matrix based on the direct relation matrix and the loop relation matrix; and generating the second state diagram based on the final matrix.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  receiving, by a device, input data identifying user stories, test case documents, event logs, and application logs associated with an application;
  processing, by the device, the input data, with a machine learning model, to determine application change data and application overview data associated with the application;
  performing, by the device using a natural language tool kit, natural language processing on the user stories and the test case documents, identified in the input data, to generate a first state diagram associated with the application;
  processing, by the device, the event logs identified in the input data, with a heuristic miner model, to generate a second state diagram associated with the application;
  processing, by the device, the application logs identified in the input data, with a clustering model, to generate a volumetric analysis associated with the application;
  performing, by the device and using the natural language tool kit, post processing of the first state diagram, the second state diagram, the volumetric analysis, the application change data, and the application overview data, to remove duplicate data and unmeaningful data and to generate modified outputs,
    wherein the modified outputs include one or more of:
      a modified first state diagram,
      a modified second state diagram,
      a modified volumetric analysis,
      modified application change data, or
      modified application overview data; and
  performing, by the device, one or more actions based on the modified outputs,
    wherein the one or more actions includes modifying the application.

2. The method of claim 1, wherein performing the one or more actions comprises one or more of:
- providing, for display, one or more of the modified first state diagram, the modified second state diagram, the modified volumetric analysis, the modified application change data, or the modified application overview data;
- providing a recommendation for a modification to code of the application based on the modified outputs; or
- automatically implementing a modification to code of the application based on the modified outputs.

3. The method of claim 1, wherein performing the one or more actions comprises one or more of:
- generating estimated code for the application based on the modified outputs;
- generating a user manual for the application based on the modified outputs; or
- retraining one or more of the machine learning model, the heuristic miner model, or the clustering model based on the modified outputs.

4. The method of claim 1, wherein performing the natural language processing on the user stories and the test case documents comprises:
- removing stop words and punctuations from the user stories and the test case documents;
- tokenizing words in the user stories and the test case documents to enable analysis of the words in the user stories and the test case documents;
- removing sentences with less than a predetermined quantity of words from the user stories and the test case documents; and
- determining most frequent keywords utilized in the user stories and the test case documents.

5. The method of claim 1, wherein performing the post processing of the first state diagram, the second state diagram, the volumetric analysis, the application change data, and the application overview data comprises:
- utilizing natural language processing to remove the duplicate data and the unmeaningful data from the first state diagram, the second state diagram, the volumetric analysis, the application change data, and the application overview data.

6. The method of claim 1, wherein processing the event logs identified in the input data, with the heuristic miner model, to generate the second state diagram comprises:
- generating a dependency matrix based on the event logs;
- generating a dependency graph based on the dependency matrix;
- generating a causal matrix based on the event logs; and
- generating the second state diagram based on the dependency graph and the causal matrix.

7. The method of claim 1, wherein the machine learning model includes a random forest classifier model.

8. A device, comprising:
one or more memories; and
one or more processors, coupled to the one or more memories, configured to:
- receive input data identifying user stories, test case documents, event logs, and application logs associated with an application;
- perform, using a natural language tool kit, natural language processing on the user stories and the test case documents, identified in the input data, to generate a first state diagram associated with the application;
- process the event logs identified in the input data, with a heuristic miner model, to generate a second state diagram associated with the application;
- process the application logs identified in the input data, with a clustering model, to generate a volumetric analysis associated with the application;
- perform post processing, using the natural language tool kit, of the first state diagram, the second state diagram, and the volumetric analysis, to remove duplicate data and unmeaningful data and to generate modified outputs,
  wherein the modified outputs include one or more of:
   - a modified first state diagram,
   - a modified second state diagram, or
   - a modified volumetric analysis; and
- perform one or more actions based on the modified outputs,
  wherein the one or more actions includes modifying the application.

9. The device of claim 8, wherein the first state diagram and the second state diagram include representations of processes performed by the application.

10. The device of claim 8, wherein the volumetric analysis includes a representation of volumes of information processed by the application over a time period.

11. The device of claim 8, wherein the one or more processors, when performing the natural language processing on the user stories and the test case documents, are configured to:
- convert the user stories and the test case documents into a machine-readable text;
- split the machine-readable text into an array of words;
- split the array of words into sequences of contiguous words; and
- calculate word scores for the sequences of contiguous words.

12. The device of claim 8, wherein the one or more processors, when processing the event logs identified in the input data, with the heuristic miner model, to generate the second state diagram, are configured to:
- identify, based on the event logs, direct sequence relations and loop relations for the application;
- generate a direct relation matrix based on the direct sequence relations;
- generate a loop relation matrix based on the loop relations;
- generate a final matrix based on the direct relation matrix and the loop relation matrix; and
- generate the second state diagram based on the final matrix.

13. The device of claim 8, wherein the user stories include descriptions of functionalities of the application.

14. The device of claim 8, wherein the test case documents include sets of actions to be executed to verify functionalities of the application.

15. A non-transitory computer-readable medium storing instructions, the instructions comprising:
one or more instructions that, when executed by one or more processors, cause the one or more processors to:
- receive input data identifying user stories, test case documents, event logs, and application logs associated with an application;
- process the input data, with a machine learning model, to determine application change data and application overview data associated with the application;
- perform, using a natural language tool kit, natural language processing on the user stories and the test case documents, identified in the input data, to generate a first state diagram associated with the application;

process the event logs identified in the input data, with a heuristic miner model, to generate a second state diagram associated with the application;

process the application logs identified in the input data, with a clustering model, to generate a volumetric analysis associated with the application;

perform post processing using the natural language tool kit of the first state diagram, the second state diagram, the volumetric analysis, the application change data, and the application overview data, to remove duplicate data and unmeaningful data and to generate modified outputs, wherein the modified outputs include one or more of:
a modified first state diagram,
a modified second state diagram,
a modified volumetric analysis,
modified application change data, or
modified application overview data;

provide, for display, one or more of the modified first state diagram, the modified second state diagram, the modified volumetric analysis, the modified application change data, or the modified application overview data; and modify the application based on the modified outputs.

16. The non-transitory computer-readable medium of claim 15, wherein the instructions further comprise:

one or more instructions that, when executed by the one or more processors, cause the one or more processors to one or more of:

provide a recommendation for a modification to code of the application based on the modified outputs;

automatically implement a modification to code of the application based on the modified outputs;

generate estimated code for the application based on the modified outputs;

generate a user manual for the application based on the modified outputs; or retrain one or more of the machine learning model, the heuristic miner model, or the clustering model based on the modified outputs.

17. The non-transitory computer-readable medium of claim 15, wherein the one or more instructions, that cause the one or more processors to perform the natural language processing on the user stories and the test case documents, cause the one or more processors to:

remove stop words and punctuations from the user stories and the test case documents;

tokenize words in the user stories and the test case documents to enable analysis of the words in the user stories and the test case documents;

remove sentences with less than a predetermined quantity of words from the user stories and the test case documents; and determine most frequent keywords utilized in the user stories and the test case documents.

18. The non-transitory computer-readable medium of claim 15, wherein the one or more instructions, that cause the one or more processors to process the event logs identified in the input data, with the heuristic miner model, to generate the second state diagram, cause the one or more processors to:

generate a dependency matrix based on the event logs;

generate a dependency graph based on the dependency matrix;

generate a causal matrix based on the event logs; and generate the second state diagram based on the dependency graph and the causal matrix.

19. The non-transitory computer-readable medium of claim 15, wherein the one or more instructions, that cause the one or more processors to perform the natural language processing on the user stories and the test case documents, cause the one or more processors to:

convert the user stories and the test case documents into a machine-readable text;

split the machine-readable text into an array of words;

split the array of words into sequences of contiguous words; and calculate word scores for the sequences of contiguous words.

20. The non-transitory computer-readable medium of claim 15, wherein the one or more instructions, that cause the one or more processors to process the event logs identified in the input data, with the heuristic miner model, to generate the second state diagram, cause the one or more processors to:

identify, based on the event logs, direct sequence relations and loop relations for the application;

generate a direct relation matrix based on the direct sequence relations;

generate a loop relation matrix based on the loop relations;

generate a final matrix based on the direct relation matrix and the loop relation matrix; and generate the second state diagram based on the final matrix.

* * * * *